April 20, 1937.   G. W. WATSON   2,077,600
WELDING BY THE CHARGE OF A CONDENSER
Filed Sept. 3, 1936
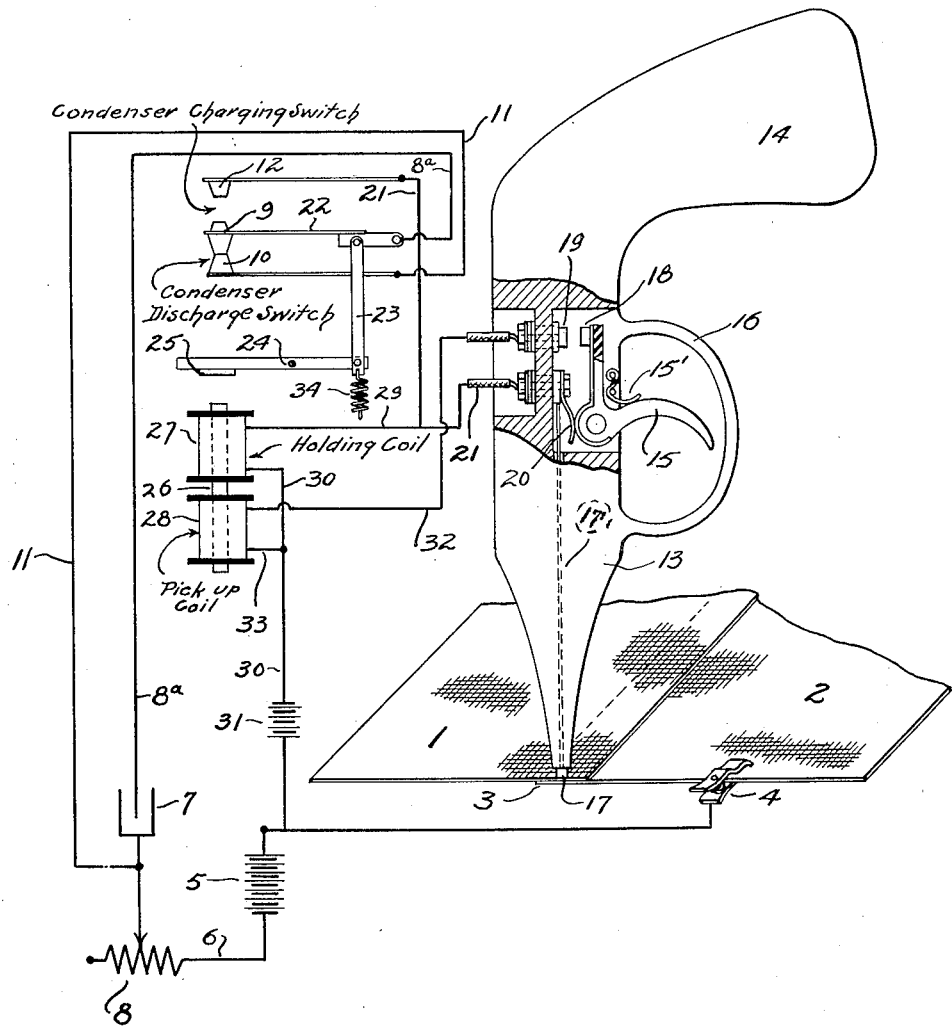
INVENTOR.
Glenn W. Watson
BY Samuel Weisman
ATTORNEY.

Patented Apr. 20, 1937

2,077,600

UNITED STATES PATENT OFFICE 2,077,600

WELDING BY THE CHARGE OF A CONDENSER

Glenn W. Watson, Detroit, Mich.

Application September 3, 1936, Serial No. 99,271

10 Claims. (Cl. 219—4)

The present invention pertains to a novel method and apparatus for welding. The principal object is to provide means for measuring and automatically delivering a measured welding current to materials to be welded. This is especially desirable in the welding of fine materials, wires, jewelry, etc., where an excess of current is liable to burn the work, but the invention is not necessarily limited to use with fine materials.

The object of the invention is accomplished by the provision of a condenser in the welding circuit in such a manner as to become charged during the welding operation. Current ceases to flow when the condenser is fully charged, and this phenomenon is utilized to stop the welding current after a definitely measured quantity has flowed. The capacity of the condenser is such as to permit the flow of sufficient current to make the weld.

The welding circuit is initially closed after the application of a welding electrode to the work. Consequently the voltage increases slowly from zero to the capacity of the condenser. This is preferable to applying the full voltage at the outset because this method of application permits the electrode to be pressed against the work before the current flows, and no clamps are necessary at the welding area to provide the desired welding pressure.

Further, due to the initial zero voltage, there is no spark at the beginning of or during the welding operation, while the condenser is being charged to capacity. For discharging the condenser, any suitable means such as a short circuit is provided. The discharge is caused to occur at a point remote from the weld in order to have no effect on the work.

The invention is fully disclosed by way of example in the following description and in the accompanying drawing which is a diagrammatic illustration of the circuit and the welding apparatus.

The pieces to be welded together are designated respectively by the numerals 1 and 2 and overlap one another at 3 where the joint is to be made. The members 1 and 2 are shown as fine screens; and the invention is adapted especially, although not exclusively, to the welding of fine materials requiring only a limited small amount of current to avoid being burned.

The welding circuit includes a suitable clamp 4 attached to one of the members 1 and 2 and wired to a battery 5 of proper rating. The other terminal of the battery is joined by a conductor 6 to one side of a condenser 7, with a variable resistance or rheostat 8 interposed for a purpose presently to be described. The other side of the condenser is wired at 8a to a movable switch element 9 engaging a fixed switch element 10 when no current is flowing. The switch element 10 is joined by a wire 11 to the battery side of the condenser, whereby the condenser is short-circuited for discharge when there is no current flowing. Above contact 9 is another fixed contact 12 for a purpose that will presently appear.

The welding tool 13 is in the shape of a gun having a handle 14, a trigger 15 and a trigger guard 16. In the point of the tool is mounted an electrode 17 adapted to engage the work. The inner end of the trigger 15 carries a switch contact member 18 adapted to engage a fixed contact 19 when the trigger is pulled. The contact 18 is also in permanent engagement with a fixed contact 20 within the tool. The contacts 18, 19 are however, normally separated by a spring 15' acting on the trigger. The contact 20 is joined by a wire 17' to the electrode 17. Further, the contact 20 is joined electrically to the contact 12 by a conductor 21.

Contact 9 is carried on a pivoted blade 22 which is moved by a pivoted non-conducting link 23. The link is also pivoted to an intermediately fulcrumed lever 24 carrying an armature 25 adapted to be attracted by an electromagnet as will presently be described.

Beneath the armature 25 is a magnet core 26 around which are wound two independent coils 27 and 28. One end of the coil 27 is joined by a conductor 29 to the conductor 21. The other end is joined by a conductor 30 into the main battery circuit at a point between the clamp 4 and the battery 5, and the conductor 30 contains a secondary battery 31.

Coil 28 has one end joined by a conductor 32 to the contact 19. The other end is joined by a conductor 33 into the conductor 30.

In the operation of the device, the electrode 17 is first brought firmly against the work while the contacts 18 and 19 are separated, thereby energizing the coil 27 from battery 31 and through conductors 30, 29 and 21. This coil, which is termed the holding coil, is not strong enough to attract the armature 25. Before pulling the trigger to bring the contacts 18, 19 together, a spring 34 pulling on the link 23 and lever 24 holds the contacts 9 and 10 in engagement with each other, thereby short-circuiting the condenser through conductors 8a and 11.

As the contacts 9 and 12 must engage one another before current can be delivered from welding battery 5 through the work, the desired pressure of electrode 17 against the work may be obtained before the current begins to flow.

When this pressure has been obtained, the operator pulls the trigger 15 to bring the contacts 18 and 19 together. This completes the circuit through the pick-up coil 28 by way of the conductors 32 and 33. The two coils, being now energized, are strong enough together to attract the armature 25, whereupon contact 9 is moved into engagement with contact 12. A circuit is now completed from clamp 4 through battery 5, rheostat 8, condenser 7, conductor 8a, contacts 9 and 12, conductors 21 and 17', electrode 17 and through the work 1 and 2 to clamp 4.

Current flows only for the time required to charge the condenser and then automatically stops. The condenser and battery are so related to each other and to the nature of the desired weld that this quantity of current is sufficient for the weld. In other words, the required quantity of current is measured and limited by the condenser. If the electrode is held in contact with the work after the current stops flowing, it merely cools. Inasmuch as the welding circuit is made after applying the electrode with pressure to the work, the voltage increases from zero to the capacity of the condenser, thereby removing the possibility of burning the material by a sudden application of the maximum voltage. This method of operation is deemed to have considerable merit over any principle whereby the current is delivered to the work in one flash at full voltage.

Although the current is measured by the condenser, slight variations therein may be made, as required, by adjustment of the rheostat 8.

Since the closing of the welding circuit depends on contact of the electrode with the work and also the pulling of the trigger, the work will be held under pressure by the electrode during the flow of welding current, with the result that no clamps are required at the welding area and a more perfect bond is obtained than if there were no pressure. Further, since the voltage gradually rises in charging the condenser, as described above, there is no spark at any time during the welding operation.

Releasing the trigger 15 to separate contacts 18 and 19 opens the circuit to pick-up coil 28, but the holding coil 27 is not de-energized until the electrode 17 is lifted from the work. The holding coil 27 alone is adapted to hold the armature 25 after having attracted it, and in fact the armature is not released until .008 or .010 second after lifting the electrode 17, the holding coil functioning as a dash pot. Thus, even though contacts 18 and 19 be separated before lifting the electrode, the condenser cannot discharge until after the electrode has been lifted. Consequently, there is no possibility of sparking at the work or welding on the condenser discharge. Moreover, the spark that occurs at contacts 9 and 12 on discharging the condenser is remote from the work and therefore has no effect on it. In this connection, it is well known in the art that a spark is liable to burn the work, especially fine work, and the avoidance of sparking is a distinct advantage.

Also it will be noted that should the operator mistakenly pull trigger 15 before pressing electrode 17 to the work, current from welding battery 5 cannot pass through electrode 17 until .008 to .010 of a second has elapsed after the electrode has been pressed on the work, as the combined coils 27 and 28 are required to move armature 25, and close contacts 9 and 12.

Although a specific embodiment of the invention has been illustrated and described, it will be understood that various alterations in the details of construction and operation may be made without departing from the scope of the invention as indicated by the appended claims.

What I claim is:

1. In a welding circuit, a condenser in said welding circuit and adapted to be charged by and during the flow of the welding current, and means for discharging said condenser.

2. In a welding circuit, an electrode for engaging the work, a condenser in said welding circuit adapted to be charged by and during flow of welding current through said electrode and the work, and means for discharging said condenser remotely from the work.

3. In a welding circuit, a battery adapted to have one terminal fastened to the work, a condenser connected to the other terminal of said battery, an electrode connected to said condenser and adapted to engage the work, separate means for closing the welding circuit through said electrode and the work, and means for discharging said condenser remotely from the work.

4. In a welding circuit, a battery adapted to have one terminal fastened to the work, a condenser connected to the other terminal of said battery, an electrode tool connected to said condenser and adapted to engage the work, and a switch carried by said tool for discharging said condenser.

5. In a welding circuit, a condenser in said welding circuit and adapted to be charged by and during the flow of the welding current, and a switch for discharging said condenser.

6. In a welding circuit, a condenser in said welding circuit and adapted to be charged by and during the flow of the welding current, a switch controlling current for charging said condenser, a solenoid for operating said switch, and a manual switch wired in said circuit to deliver current to said solenoid.

7. In a welding circuit, a battery adapted to have one terminal fastened to the work, a condenser connected to the other terminal of said battery, an electrode tool connected to said condenser and adapted to engage the work, a switch controlling current for charging said condenser, a solenoid for operating said switch, and a manual switch carried by said tool and wired in said circuit to deliver current to said solenoid.

8. In a welding circuit, a condenser adapted to be charged by and during the flow of the welding current, a switch controlling current for charging said condenser, a solenoid for operating said switch, and a manual switch wired in said circuit to deliver current to said solenoid, and another switch for discharging said condenser.

9. In a welding circuit, a condenser in said welding circuit and adapted to be charged by and during the flow of the welding current, a condenser discharge switch normally short-circuiting said condenser, an electrode adapted to engage the work and connected to one side of said condenser, means for connecting the other side of said condenser to the work, a source of current interposed between the work and said other side of the condenser, a normally open condenser charging switch inserted between said electrode and condenser, a movable armature adapted, when attracted, to simultaneously open said discharge switch and close said charging switch, a holding coil and a pick-up coil adapted together to attract said armature, the holding coil being wired directly to said electrode and the work, a manual switch having one side connected to said electrode and the other side to one end of the pick-up coil, the other end of the pick-up coil being wired to the work, said holding coil being adapted alone to hold said armature after attraction by both coils, whereby said armature is not released to close the discharge switch until after lifting said electrode from the work, notwithstanding opening of said manual switch.

10. In a welding circuit, a condenser in said circuit and adapted to be charged by and during the flow of the welding current, said condenser functioning as a non-mechanical switch to cut off the current flowing to the weld, and means for discharging said condenser.

GLENN W. WATSON.